(12) United States Patent
Zhou

(10) Patent No.: US 9,708,536 B2
(45) Date of Patent: Jul. 18, 2017

(54) INORGANIC FIREPROOF AND HEAT-INSULATING MATERIAL AND ARTICLE THEREOF

(71) Applicant: Guofu Zhou, Shenzhen (CN)

(72) Inventor: Guofu Zhou, Shenzhen (CN)

( * ) Notice: Subject to any disclaimer, the term of this patent is extended or adjusted under 35 U.S.C. 154(b) by 394 days.

(21) Appl. No.: 14/371,454

(22) PCT Filed: Dec. 20, 2012

(86) PCT No.: PCT/CN2012/087031
§ 371 (c)(1),
(2) Date: Jul. 10, 2014

(87) PCT Pub. No.: WO2013/107242
PCT Pub. Date: Jul. 25, 2013

(65) Prior Publication Data
US 2015/0010750 A1 Jan. 8, 2015

(30) Foreign Application Priority Data
Jan. 19, 2012 (CN) .......................... 2012 1 0017916

(51) Int. Cl.
*C09K 21/02* (2006.01)
*E04B 1/80* (2006.01)
(Continued)

(52) U.S. Cl.
CPC .............. *C09K 21/02* (2013.01); *C04B 20/06* (2013.01); *C04B 28/26* (2013.01); *E04B 1/80* (2013.01);
(Continued)

(58) Field of Classification Search
None
See application file for complete search history.

(56) References Cited

U.S. PATENT DOCUMENTS

| | | | | |
|---|---|---|---|---|
| 3,015,626 A | * | 1/1962 | Kingsbury | ............. C04B 26/02 106/283 |
| 3,445,257 A | * | 5/1969 | Nikolay | ................. C01B 25/38 106/629 |

FOREIGN PATENT DOCUMENTS

| | | |
|---|---|---|
| CN | 85106105 A | 4/1987 |
| CN | 1149525 A | 5/1997 |
| CN | 101775882 A | 7/2010 |

OTHER PUBLICATIONS

Machine translation CN1149525 (1997).*
International Search Report of PCT Patent Application No. PCT/CN2012/087031 issued on Mar. 28, 2013.

* cited by examiner

*Primary Examiner* — Alexandre Ferre

(57) ABSTRACT

Disclosed are an inorganic fireproof and heat-insulating material and an article thereof. The material comprises the following components in weight ratio: 5 parts of A component, 5.5-7 parts of a bonding agent, and 1-1.5 parts of a curing agent, wherein the A component comprises perlite and vermiculite in a weight ratio of 1:4 to 4:1. Both the perlite and vermiculite are in particle form after expansion, and the bonding agent is an inorganic bonding agent. The material is formed by mixing the abovementioned components, then pouring same into a forming mold, and pressing. The present invention has good fireproof performance and heat insulation performance. A fireproof and heat-insulating plate made by mixing the expanded perlite, vermiculite, and elutriated mud (i.e. pottery clay) improves the strength thereof, and satisfies the requirements for an external wall on waterproofing, fireproof and heat insulation.

9 Claims, 2 Drawing Sheets

(51) Int. Cl.
*C04B 28/26* (2006.01)
*C04B 20/06* (2006.01)
C04B 111/28 (2006.01)
E04B 1/76 (2006.01)

(52) U.S. Cl.
CPC ......... *C04B 2111/28* (2013.01); *E04B 1/7675* (2013.01); *Y10T 428/259* (2015.01)

INORGANIC FIREPROOF AND HEAT-INSULATING MATERIAL AND ARTICLE THEREOF

FIELD OF THE INVENTION

The present invention relates to an inorganic fireproof and heat-insulating material and an article thereof, and such a material can be used for external wall to play a role of heat insulation and fire prevention and also can be used for building interior wall and partition, and ships and so on.

BACKGROUND OF THE INVENTION

In the existing technology, some organic materials, such as polyurethane, benzene board, extruded sheet and so on, are usually used on the outer wall and housetop of building and other special buildings for heat-insulation, so as to prevent the outside world from influencing the interior of the buildings. However, it is easy to cause a fire because of bad fireproof performance of the heat-insulating materials of these external walls. For example, in November 2010, a fire which occurred in teachers' building in Jing' an District of Shanghai was caused by the combustible heat-insulating materials of polyurethane used for external walls of the building and the result was forty-two people died in the fire. In the eighties of last century, a standard of energy conservation and heat-insulation of civil building was issued in our country, which demanded to save energy by 30% and to add heat-insulating performance of external walls based on the original buildings. In 1995, another standard of energy conservation and heat-insulation of civil building was issued in our country, which demanded to save energy by 50%. The standard was enforced in all northern regions for new buildings until 2003. However, it is known as most traditional heat-insulating materials used for external walls is combustible materials such as benzene board, extruded sheet and polyurethane and so on. In 2009, fires were frequently occurred in our country, such as a fire in the new building of CCTV (China Central Television), a fire in south area of CAFA (Central Academy Of Fine Arts) and a fire in the new building of central museum and so on, and all the above mentioned fires were relevant to the heat-insulating materials of external walls, and furthermore, fire cases relevant to the heat-insulating materials of external walls occurred continuously in Xinjiang. These frequently happened fires were caused by not having fire prevention performance of the heat-insulating materials and a lot of poisonous gas was produced during burning. Especially in the north, the external walls of buildings were built by using the heat-insulating materials without having fire prevention performance, thus, it brought an enormous fire hazard.

Our country has abundant perlite resources. After expansion, the perlite is very crisp, is broken easily and has low strength, but it has better heat-insulating performance. The vermiculite is also a wonderful heat-insulating material. Our country is the second resources country of vermiculite in the world. After expansion at high temperature, the vermiculite is also a good heat-insulating material. Although our country has abundant perlite and vermiculite resources, they are not fully utilized and this make the heat-insulating structures of existing external walls usually made with combustible materials, such as benzene board, extruded sheet and polyurethane and so on.

In view of the situation of the above prior art, the inventor develops an inorganic fireproof and heat-insulating material, which can be used for external wall to play a role of heat insulation and fire prevention and also can be used for building interior wall and partition, and ships and so on, so as to meet the requirements of heat insulation, fire prevention and water-proofing.

SUMMARY OF THE INVENTION

An object of the present invention is to overcome the defects of the prior art by means of providing an inorganic fireproof and heat-insulating material and an article thereof, which can be used for external wall to play a role of heat insulation and fire prevention and also can be used for building interior wall and partition, and ships and so on, so as to meet the requirements of heat insulation, fire prevention and water-proofing.

To achieve the above object, the present invention adopts the following technical solutions:

An inorganic fireproof and heat-insulating material comprises the following components in weight ratio: 5 parts of A component; 5.5-7 parts of bonding agent; and 1-1.5 parts of curing agent. The A component comprises perlite and vermiculite in a weight ratio of 1:4 to 4:1; the perlite and vermiculite are both in particle form after expansion, and respectively have a particle size of 0.5-8 mm and 0.5-20 mm; the perlite has a volume-weight of 80-200 $Kg/m^3$ and the vermiculite has a volume-weight of 100-200 $Kg/m^3$; the bonding agent is inorganic bonding agent; and the material is formed by mixing the abovementioned components, pouring same into a forming mold and then pressing the same.

Its further technical solution is: the curing agent is sodium fluosilicate.

Its further technical solution is: the inorganic bonding agent is water glass.

Its further technical solution is: further comprises pottery clay which is 15%-25% of the perlite in weight ratio, the pottery clay being mixed with the perlite, then being mixed with other components and then being pressurized in the mold.

Its further technical solution is: the heat-insulating material is formed by providing expanded particle of the perlite produced by puffing at a temperature of 850° C.-1350° C., expanded particle of the vermiculite produced by puffing at a temperature of 700° C.-1250° C., the inorganic bonding agent and the curing agent to be pressurized to 18-50Mpa in the mold at a temperature of 70° C. -245° C. and keeping it for 15-60 minutes.

An inorganic fireproof and heat-insulating plate comprising a plate body, the plate body is made with inorganic fireproof and heat-insulating material.

Its further technical solution is: further comprises a decorative layer which is provided on surface of the plate body.

An inorganic fireproof and heat-insulating external wall structure comprising a wall body, a fireproof and heat-insulating layer made with inorganic fireproof and heat-insulating material is provided on surface of the wall body.

Its further technical solution is: the wall body is wooden wall, concrete wall or metal wall.

Its further technical solution is: the wall body has a cylinder structure and the fireproof and heat-insulating layer is formed by more than two cambered fireproof and heat-insulating plates.

Compared with the prior art, the present invention has the following advantages: disclosed by the present invention is providing perlite and vermiculite after expansion to mix with bonding agent, elutriated mud (i.e. pottery clay) and curing agent and then pressing them in a specific mold at a temperature of 70° C.-245° C., so as to form a fireproof and heat-insulating material, which has good fireproof performance and heat insulation performance, a density of up to approximately 0.22 ton/cubic meter, a combustion performance of A1 grade, and a heat conductivity coefficient of 0.035-0.0664 W/(m.k) (25° C.). A fireproof and heat-insulating plate made by mixing the expanded perlite, vermiculite, and elutriated mud (i.e. pottery clay) improves the strength thereof, and satisfies the requirements for an external wall on waterproofing, fireproof and heat insulation. It has features such as being environmentally friendly, low in carbon, energy-saving and renewable. During its manufacture, its strength can be improved by adding pottery clay, and its productivity can be enhanced by adding modified silicone oil, so as to reduce the production cost and be conductive to achieve industrialization of the materials of the present invention. The product contains no harmful substances, is a fully environmentally friendly product, and is very suitable for the heat insulation of an external wall in various building structures, and it also can be used for internal structure of building, for example, be used for composite wall plate (i.e. color plate) or core material of lightweight composite partition wall of building structures and also can be used for core material of cabin partition (stainless steel plate).

The present invention will be further described by combining accompanying drawings and embodiments as follows.

Figure 1:
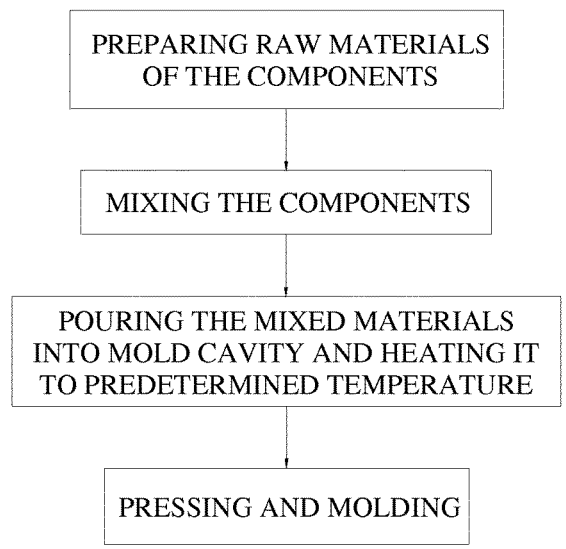
FIG. 1 is a process flow diagram of an inorganic fireproof and heat-insulating material according to a specific embodiment of the present invention.

Plate body 1; decorative layer 2; fireproof and heat-insulating layer 3; flat wall body 4; cambered fireproof and heat-insulating plate 5; and cylinder structure 6.

DETAILED DESCRIPTION OF ILLUSTRATED EMBODIMENTS

For understanding the technical content of the present invention more sufficiently, a technical solution of the present invention will now be further introduced and described as follows, by way of example only, with reference to some special embodiments.

An inorganic fireproof and heat-insulating material of the present invention includes the following components in weight ratio: 5 parts of A component, 5.5-7 parts of bonding agent, and 1-1.5 parts of curing agent, wherein the A component comprises perlite and vermiculite in a weight ratio of 1:4 to 4:1. Both the perlite and vermiculite are in particle form after expansion, and with a particle size of 0.5-8 mm and 0.5-20 mm, respectively. The perlite has a volume-weight of 80-200 kilogram/cubic meter and the vermiculite has a volume-weight of 100-200 kilogram/cubic meter; the bonding agent is an inorganic bonding agent; and the material is formed by mixing the abovementioned components, then pouring them into a forming mold, and then pressing them. The material is made by providing expanded particle of the perlite produced by puffing at a temperature of 850° C.-1350° C., expanded particle of the vermiculite produced by puffing at a temperature of 700° C. -1250° C., the inorganic bonding agent and the curing agent to be pressurized to 18-50 Mpa in the mold at a temperature of 70° C.-245° C. and keeping it for 15-60 minutes. The inorganic bonding agent is water glass (known as silicate of soda or sodium silicate) which can be sodium water glass or potash water glass; and the curing agent is sodium fluosilicate. Its manufacturing process is shown in FIG. 1.

The features of the material will be further illustrated with reference to the following embodiments:

In embodiment 1, the material is made by mixing the following components:
3 Kg of perlites, with a volume-weight of 130 kilogram/cubic;
2 Kg of vermiculites, with a volume-weight of 130 kilogram/cubic;
5.5 Kg of bonding agents, which are sodium water glass;
1 Kg of curing agents, which are sodium fluosilicate.

Forming pressure is 20 Mpa, forming time is 30 minutes and temperature is 200-245° C. Finally, the tested density of the molded inorganic fireproof and heat-insulating material is 222 Kg/m$^3$.

In embodiment 2, the material is made by mixing the following components:
8 Kg of perlites, with a volume-weight of 110 kilogram/cubic;
2 Kg of vermiculites, with a volume-weight of 130 kilogram/cubic;
14 Kg of bonding agents, which are sodium water glass;
3 Kg of curing agents, which are sodium fluosilicate.

Forming pressure is 20Mpa, forming time is 40 minutes and temperature is 190-230° C. Finally, the tested density of the molded inorganic fireproof and heat-insulating material is 219.5 Kg/m$^3$.

In embodiment 3, the material is made by mixing the following components:
1.5 Kg of perlites, with a volume-weight of 125 kilogram/cubic;
6 Kg of vermiculites, with a volume-weight of 150 kilogram/cubic;
8.5 Kg of bonding agents, which are sodium water glass;
0.9 Kg of curing agents, which are sodium fluosilicate.

Forming pressure is 20 Mpa, forming time is 45 minutes and temperature is 210-245° C. Finally, the tested density of the molded inorganic fireproof and heat-insulating material is 238 Kg/m$^3$.

In embodiment 4, the material is made by mixing the following components:
5.5 Kg of perlites, with a volume-weight of 115 kilogram/cubic;
1.5 Kg of vermiculites, with a volume-weight of 135 kilogram/cubic;
9 Kg of bonding agents, which are sodium water glass;
0.7 Kg of curing agents, which are sodium fluosilicate.

Forming pressure is 20 Mpa, forming time is 40 minutes and temperature is 180-215° C. Finally, the tested density of the molded inorganic fireproof and heat-insulating material is 206 Kg/m$^3$.

In embodiment 5, the material is made by mixing the following components:
5 Kg of perlites, with a volume-weight of 100 kilogram/cubic;
3 Kg of vermiculites, with a volume-weight of 170 kilogram/cubic;

10 Kg of bonding agents, which are potash water glass;
1 Kg of curing agents, which are sodium fluosilicate.

Forming pressure is 30 Mpa, forming time is 35 minutes and temperature is 190-225° C. Finally, the tested density of the molded inorganic fireproof and heat-insulating material is 205 Kg/m³. The tensile strength and compressive strength of a plate made with the abovementioned material and with thickness of 20 mm are respectively 123 Kpa and 613 Kpa.

In this embodiment, 0.75 Kg of pottery clays are added to the above components to form a new fireproof and heat-insulating material and the density of the material is increased from 205 Kg/m³ to 214 Kg/m³. The tensile strength and compressive strength of a plate made with the abovementioned material and with thickness of 20 mm are respectively increased to 141.5 Kpa and 698.8 Kpa, which have respectively increased by 15% and 14%.

In embodiment 6, the material is made by mixing the following components:
7 Kg of perlites, with a volume-weight of 110 kilogram/cubic;
6 Kg of vermiculites, with a volume-weight of 115 kilogram/cubic;
15 Kg of bonding agents, which are potash water glass;
1.5 Kg of curing agents, which are sodium fluosilicate.

Forming pressure is 30 Mpa, forming time is 35 minutes and temperature is 180-215° C. Finally, the tested density of the molded inorganic fireproof and heat-insulating material is 189 Kg/m³.

In embodiment 7, the material is made by mixing the following components:
3 Kg of perlites, with a volume-weight of 120 kilogram/cubic;
6 Kg of vermiculites, with a volume-weight of 130 kilogram/cubic;
10 Kg of bonding agents, which are potash water glass;
1.5 Kg of curing agents, which are sodium fluosilicate.

Forming pressure is 30 Mpa, forming time is 45 minutes and temperature is 200-245° C. Finally, the tested density of the molded inorganic fireproof and heat-insulating material is 213.8 Kg/m³.

In embodiment 8, the material is made by mixing the following components:
7 Kg of perlites, with a volume-weight of 120 kilogram/cubic;
2 Kg of vermiculites, with a volume-weight of 130 kilogram/cubic;
13 Kg of bonding agents, which are potash water glass;
1.3 Kg of curing agents, which are sodium fluosilicate.

Forming pressure is 30 Mpa, forming time is 60 minutes and temperature is 200-245° C. Finally, the tested density of the molded inorganic fireproof and heat-insulating material is 224 Kg/m³.

In embodiment 9, the material is made by mixing the following components:
3 Kg of perlites, with a volume-weight of 150 kilogram/cubic;
1 Kg of vermiculites, with a volume-weight of 150 kilogram/cubic;
6 Kg of bonding agents, which are sodium water glass;
0.5 Kg of curing agents, which are sodium fluosilicate.

Forming pressure is 25 Mpa, forming time is 60 minutes and temperature is 200-245° C. Finally, the tested density of the molded inorganic fireproof and heat-insulating material is 271 Kg/m³.

In embodiment 10, the material is made by mixing the following components:
8 Kg of perlites, with a volume-weight of 130 kilogram/cubic;
5 Kg of vermiculites, with a volume-weight of 150 kilogram/cubic;
15 Kg of bonding agents, which are sodium water glass;
1.5 Kg of curing agents, which are sodium fluosilicate.

Forming pressure is 25 Mpa, forming time is 60 minutes and temperature is 200-245° C. Finally, the tested density of the molded inorganic fireproof and heat-insulating material is 228 Kg/m³.

In embodiment 11, the material is made by mixing the following components:
3.2 Kg of perlites, with a volume-weight of 120 kilogram/cubic;
4.9 Kg of vermiculites, with a volume-weight of 110 kilogram/cubic;
11 Kg of bonding agents, which are sodium water glass;
1.2 Kg of curing agents, which are sodium fluosilicate.

Forming pressure is 25 Mpa, forming time is 55 minutes and temperature is 200-245° C. Finally, the tested density of the molded inorganic fireproof and heat-insulating material is 205.5 Kg/m³.

In embodiment 12, the material is made by mixing the following components:
8 Kg of perlites, with a volume-weight of 130 kilogram/cubic;
3 Kg of vermiculites, with a volume-weight of 110 kilogram/cubic;
15 Kg of bonding agents, which are sodium water glass;
1.5 Kg of curing agents, which are sodium fluosilicate.

Forming pressure is 25 Mpa, forming time is 65 minutes and temperature is 190-215° C. Finally, the tested density of the molded inorganic fireproof and heat-insulating material is 221.5 Kg/m³.

In embodiment 13, the material is made by mixing the following components:
3.7 Kg of perlites, with a volume-weight of 140 kilogram/cubic;
2.9 Kg of vermiculites, with a volume-weight of 150 kilogram/cubic;
8 Kg of bonding agents, which are sodium water glass;
0.66 Kg of curing agents, which are sodium fluosilicate.

Forming pressure is 40 Mpa, forming time is 65 minutes and temperature is 220-245° C. Finally, the tested density of the molded inorganic fireproof and heat-insulating material is 241 Kg/m³.

In embodiment 14, the material is made by mixing the following components:
8.8 Kg of perlites, with a volume-weight of 135 kilogram/cubic;
6.95 Kg of vermiculites, with a volume-weight of 120 kilogram/cubic;
20 Kg of bonding agents, which are sodium water glass;
1.8 Kg of curing agents, which are sodium fluosilicate.

Forming pressure is 40 Mpa, forming time is 35 minutes and temperature is 205-225° C. Finally, the tested density of the molded inorganic fireproof and heat-insulating material is 221 Kg/m³.

In embodiment 15, the material is made by mixing the following components:
3.7 Kg of perlites, with a volume-weight of 100 kilogram/cubic;
6.95 Kg of vermiculites, with a volume-weight of 115 kilogram/cubic;
12.5 Kg of bonding agents, which are sodium water glass;
1.5 Kg of curing agents, which are sodium fluosilicate.

Forming pressure is 40 Mpa, forming time is 45 minutes and temperature is 220-245° C. Finally, the tested density of the molded inorganic fireproof and heat-insulating material is 188 Kg/m$^3$.

In embodiment 16, the material is made by mixing the following components:

8.8 Kg of perlites, with a volume-weight of 135 kilogram/cubic;

2.9 Kg of vermiculites, with a volume-weight of 120 kilogram/cubic;

15 Kg of bonding agents, which are sodium water glass;

1.2 Kg of curing agents, which are sodium fluosilicate.

Forming pressure is 40 Mpa, forming time is 45 minutes and temperature is 230-245° C. Finally, the tested density of the molded inorganic fireproof and heat-insulating material is 225 Kg/m$^3$. The tensile strength and compressive strength of a plate made with the abovementioned material and with thickness of 20 mm are respectively 119 Kpa and 594 Kpa.

In this embodiment, 2.2 Kg of pottery clays are added to the above components to form a new fireproof and heat-insulating material and the density of the material is increased from 225 Kg/m$^3$ to 245.5 Kg/m$^3$. The tensile strength and compressive strength of a plate made with the abovementioned material and with thickness of 20 mm are respectively increased to 139.2 Kpa and 693.8 Kpa, which have respectively increased by 17% and 16.8%.

In embodiment 17, the material is made by mixing the following components:

4.5 Kg of perlites, with a volume-weight of 110 kilogram/cubic;

7.15 Kg of vermiculites, with a volume-weight of 150 kilogram/cubic;

13.6 Kg of bonding agents, which are sodium water glass;

1.2 Kg of curing agents, which are sodium fluosilicate.

Forming pressure is 44 Mpa, forming time is 40 minutes and temperature is 230-245° C. Finally, the tested density of the molded inorganic fireproof and heat-insulating material is 223 Kg/m$^3$.

In embodiment 18, the material is made by mixing the following components:

9.96 Kg of perlites, with a volume-weight of 110 kilogram/cubic;

4.15 Kg of vermiculites, with a volume-weight of 130 kilogram/cubic;

19.6 Kg of bonding agents, which are sodium water glass;

1.5 Kg of curing agents, which are sodium fluosilicate.

Forming pressure is 32 Mpa, forming time is 41 minutes and temperature is 210-240° C. Finally, the tested density of the molded inorganic fireproof and heat-insulating material is 214 Kg/m$^3$.

In embodiment 19, the material is made by mixing the following components:

10.65 Kg of perlites, with a volume-weight of 130 kilogram/cubic;

9.76 Kg of vermiculites, with a volume-weight of 140 kilogram/cubic;

22 Kg of bonding agents, which are sodium water glass;

2.1 Kg of curing agents, which are sodium fluosilicate.

Forming pressure is 26 Mpa, forming time is 45 minutes and temperature is 210-240° C. Finally, the tested density of the molded inorganic fireproof and heat-insulating material is 218 Kg/m$^3$. The tensile strength and compressive strength of a plate made with the abovementioned material and with thickness of 20 mm are respectively 133 Kpa and 689 Kpa.

In this embodiment, 1.65 Kg of pottery clays are added to the above components to form a new fireproof and heat-insulating material and the density of the material is increased from 218 Kg/m$^3$ to 227 Kg/m$^3$. The tensile strength and compressive strength of a plate made with the abovementioned material and with thickness of 20 mm are respectively increased to 156.9 Kpa and 825 Kpa, which have respectively increased by 18% and 18.2%.

In embodiment 20, the material is made by mixing the following components:

6.61 Kg of perlites, with a volume-weight of 150 kilogram/cubic;

5.8 Kg of vermiculites, with a volume-weight of 110 kilogram/cubic;

15 Kg of bonding agents, which are sodium water glass;

1.3 Kg of curing agents, which are sodium fluosilicate.

Forming pressure is 20 Mpa, forming time is 50 minutes and temperature is 200-220° C. Finally, the tested density of the molded inorganic fireproof and heat-insulating material is 217 Kg/m$^3$. The tensile strength and compressive strength of a plate made with the abovementioned material and with thickness of 20 mm are respectively 136 Kpa and 671 Kpa.

In this embodiment, 1.3 Kg of pottery clays are added to the above components to form a new fireproof and heat-insulating material and the density of the material is increased from 217 Kg/m$^3$ to 228 Kg/m$^3$. The tensile strength and compressive strength of a plate made with the abovementioned material and with thickness of 20 mm are respectively increased to 164.6 Kpa and 805.9 Kpa, which have respectively increased by 21% and 20.1%.

In embodiment 21, the material is made by mixing the following components:

12.6 Kg of perlites, with a volume-weight of 105 kilogram/cubic;

11.8 Kg of vermiculites, with a volume-weight of 200 kilogram/cubic;

28 Kg of bonding agents, which are sodium water glass;

2.5 Kg of curing agents, which are sodium fluosilicate.

Forming pressure is 31 Mpa, forming time is 45 minutes and temperature is 210-235° C. Finally, the tested density of the molded inorganic fireproof and heat-insulating material is 225 Kg/m$^3$.

In embodiment 22, the material is made by mixing the following components:

8.6 Kg of perlites, with a volume-weight of 190 kilogram/cubic;

12.9 Kg of vermiculites, with a volume-weight of 110 kilogram/cubic;

24 Kg of bonding agents, which are sodium water glass;

2.2 Kg of curing agents, which are sodium fluosilicate.

Forming pressure is 10 Mpa, forming time is 55 minutes and temperature is 200-220° C. Finally, the tested density of the molded inorganic fireproof and heat-insulating material is 217 Kg/m$^3$.

In embodiment 23, the material is made by mixing the following components:

15.6 Kg of perlites, with a volume-weight of 150 kilogram/cubic;

12.9 Kg of vermiculites, with a volume-weight of 140 kilogram/cubic;

32 Kg of bonding agents, which are sodium water glass;

3.3 Kg of curing agents, which are sodium fluosilicate.

Forming pressure is 18 Mpa, forming time is 60 minutes and temperature is 230-245° C. Finally, the tested density of the molded inorganic fireproof and heat-insulating material is 239 Kg/m$^3$.

In the abovementioned embodiments, the proportion of bonding agent is the parts of solvent, i.e. weight ratio of water glass (in all the embodiments, water content in the water glass is about 40%). The density (i.e. proportion or volume weight) of the material of each embodiment is about 220 Kg/m3. The inorganic fireproof and heat-insulating material of the present invention has a combustion performance reaching to A1 grade and a heat conductivity coefficient of 0.035-0.0664 W/(m.k) (25° C.). The average value of compressive strength of all the embodiments is 660 Kpa and the average value of tensile strength is 130 Kpa. In the embodiments 5, 16, 19, 20, pottery clay is added. The pottery clay is 15%-25% of the perlite in weight ratio, and it is mixed with the perlite and then mixed with the other components and finally pressed in the mold. The pottery clay is used to block the tiny pores on the perlite, and increase the intensity of the perlite and then increase the intensity of the material of the present invention. In the embodiments 5, 16, 19, 20, due to adding the pottery clay, the intensity of the material of the present invention increases by 15%-21%. It can be concluded from the abovementioned embodiments that, the density of the material can be reduced by increasing the weight of perlite which has low density, and the density of the material can be increased by increasing the weight of vermiculite, which has moderate density, or bonding agent, which has high density. Thus, when the fireproof and heat-insulating material of the present invention is used as external wall decorative material which needs low density, the proportion of perlite can be increased appropriately, so as to reduce the density of the material of the present invention for easy installation.

On the basis of production practice, the following technical know-how is achieved: in the abovementioned embodiments, especially in embodiments 5, 16, 19 and 20, modified silicone oil of 2%-3% of the A component in weight can be added into the mixed material of all components, so as to improve the mixing effect of all components when mixing and benefit the rapid forming after heating and pressing, thereby shortening the forming time.

Wherein, the techniques about the formula of all the components are as follows:

1. The perlite with low density can be combined with the vermiculite with high density, and the perlite with high density can be combined with the vermiculite with low density, so as to reduce the relative density of the material of the present invention, thus it is conductive to the use and installation thereof; and additionally, by means of making best use of the perlite and vermiculite with different densities, the use ratio of raw material can be increased, thereby being conductive to the cost reduction. Wherein, the densities of perlite and vermiculite are lower the sizes of their particles are bigger, and the densities of perlite and vermiculite are higher the sizes of their particles are smaller, thus, when the perlite with low density is combined with the vermiculite with high density, it can form a fireproof material the same as that formed by combining the perlite with high density and the vermiculite with low density. But the former is lighter and more crisp, and the latter is heavier and has higher strength.

2. Due to the different characteristics of the perlite and vermiculite, different materials can be formed according to the actual needs of external walls, for example, when the external wall is required to have a high strength, the proportion of vermiculite can be increased and the proportion of perlite can be reduced; and when the external wall is required to have a relative lower density, the proportion of perlite can be increased and the proportion of vermiculite can be reduced.

Figures 2, 3:
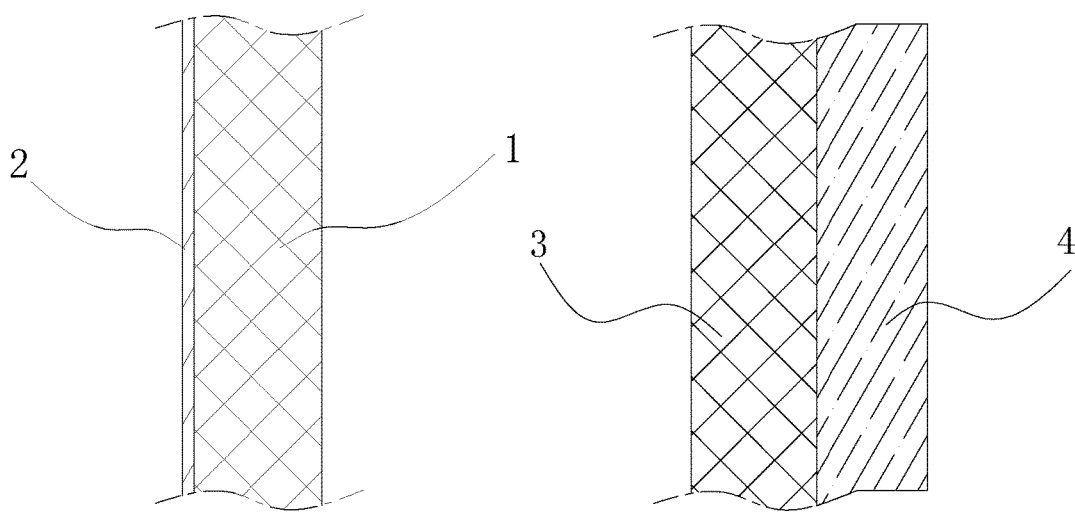
FIG. 2 is a sectional view of an inorganic fireproof and heat-insulating plate according to a specific embodiment of the present invention.
FIG. 3 is a sectional view of an inorganic fireproof and heat-insulating external wall structure according to a first specific embodiment of the present invention.

As shown in FIG. 2, which are a sectional view of a fireproof and heat-insulating plate of the present invention, its main body (i.e. plate body 1) is made with fireproof heat-insulating material formed by vermiculite and expanded vermiculite. The surface of main body can be coated with a decorative layer 2, such as fireproof and heat-insulating coating, or other bonding layer, such as a metal layer (aluminum foil, copper foil and so on) laminated with the main body, so as to achieve better decorative effect, because the main body is formed by granular perlite and vermiculite and its surface is irregular.

As shown in FIG. 3, an inorganic fireproof and heat-insulating external wall structure of the present invention includes a wall body (flat wall body 4) and the surface of wall body has a fireproof and heat-insulating layer 3, which is made with inorganic fireproof and heat-insulating material, provided thereon. The flat wall body 4 can be wooden wall, concrete wall or metal wall.

Figure 4:
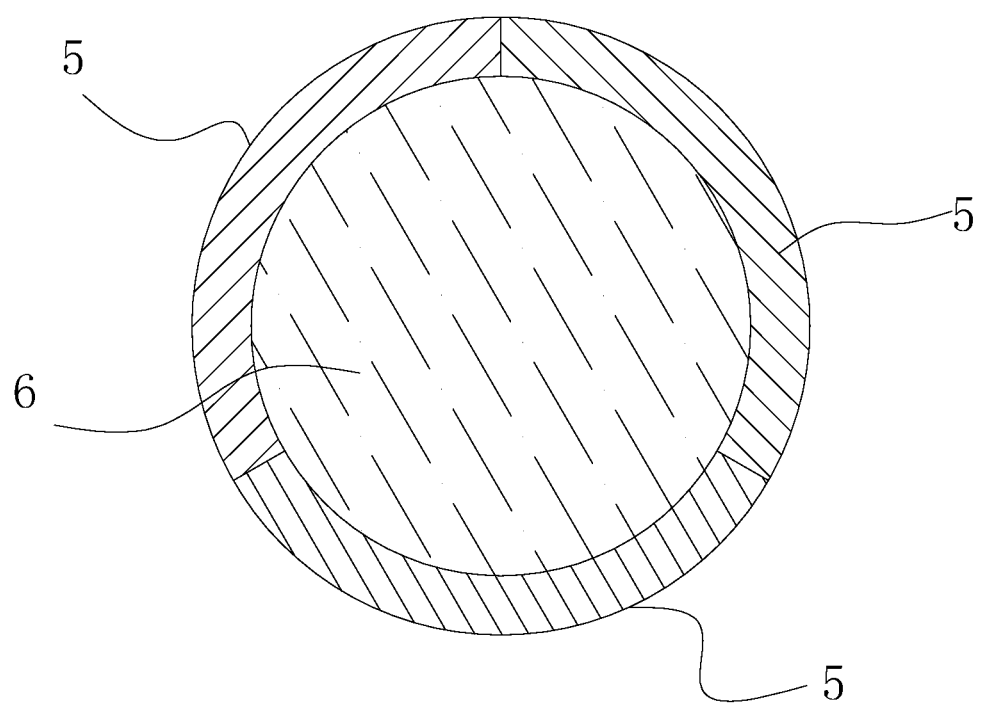
FIG. 4 is a sectional view of an inorganic fireproof and heat-insulating external wall structure according to a second specific embodiment of the present invention.

As shown in FIG. 4, which shows an inorganic fireproof and heat-insulating external wall structure of the present invention according to another embodiment, the wall body has a cylinder structure, i.e., the cylinder building mass 6 and the fireproof and heat-insulating layer is formed by three cambered fireproof and heat-insulating plates 5.

The fireproof heat-insulating material of the present invention can be applied to the heat insulation of external wall in various building structures, and its form can be changed according to the structure of the external wall. All sorts of shape and size of the fireproof heat-insulating material can be formed according the special shape and size of the wall. Because the original surface of wall body is not always a flat surface, it needs to add a leveling course (made with waterproof flexible putty) to certain wall bodies. The requirement details are as follows: (1) besides an aerated concrete wall, there is provided a cement mortar leveling course on the outer side of basic wall body; its bonding strength should conform to the related requirements; and the thickness of the cement mortar leveling course can be determined according to the flatness of the basic wall body but should not less than 12 mm; (2) if the basic wall body is concrete wall, autoclaved sand-lime brick masonry or silicate brick masonry, an interface layer made with concrete interfacial agent should be provided between the basic wall body and the cement mortar leveling course; and (3) if the basic wall body is an aerated concrete wall or external wall, its surface should be coated with specialized interfacial agent and the specialized interfacial agent can be further covered with a cement mortar leveling course with thickness of 10 mm.

The fireproof heat-insulating material are connected to the wall body primarily by bonding agent (i.e. connection layer), supplemented by anchor bolt (i.e. connector). Generally, the number of anchor bolt should be more than three in each square meter. The number of anchor bolt should be increased around the corners of wall and at the horizontal or vertical direction of the window and door holes. The space between two anchor bolts should not be more than 300 mm, and the distance from the anchor bolt to the edge of basic wall body should not be less than 60 mm.

In conclusion, disclosed by the present invention is providing perlite and vermiculite after expansion to mix with bonding agent, elutriated mud (i.e. pottery clay and curing agent and then pressing them in a specific mold, at a definite temperature, to form a fireproof and heat-insulating material, which has good fireproof performance and heat insulation performance, a density of up to approximately 0.22 ton/cubic meter, a combustion performance of A1 grade, and a heat conductivity coefficient of 0.035-0.0664W/(m.k) (25° C.). A fireproof and heat-insulating plate made by mixing the expanded perlite, vermiculite, and elutriated mud (i.e. pottery clay) improves the strength thereof, and satisfies the requirements for an external wall on waterproofing, fireproof and heat insulation. It has features such as being environmentally friendly, low in carbon, energy-saving and renewable. The product contains no harmful substances, is a fully environmentally friendly product, and is very suitable for the heat insulation of an external wall in various building structures, and it also can be used for internal structure of building, for example, be used for composite wall plate (i.e. color plate) or core material of lightweight composite partition wall of building structures and also can be used for core material of cabin partition (stainless steel plate).

Above descriptions of embodiments are provided for illustrating the present invention, so as to facilitate understanding and it is to be understood that the invention is not to be limited to the disclosed embodiments. Any technique extension and recreation according to the present invention should be included within the scope of protection of the invention.

What is claimed is:

1. An inorganic fireproof and heat-insulating material, comprising the following components in weight ratio:
   5 parts of A component;
   5.5-7 parts of bonding agent;
   1-1.5 parts of curing agent;
   wherein the A component comprises perlite and vermiculite in a weight ratio of 1:4 to 4:1; the perlite and vermiculite are both in particle form after expansion, and respectively have a particle size of 0.5-8 mm and 0.5-20 mm; the perlite has a volume-weight of 80-200Kg/m$^3$ and the vermiculite has a volume-weight of 100-200Kg/m$^3$; the bonding agent is inorganic bonding agent; and the material is formed by mixing the abovementioned components, pouring same into a forming mold and then pressing the same;
   wherein the curing agent is sodium fluosilicate.

2. The inorganic fireproof and heat-insulating material according to claim 1, wherein the inorganic bonding agent is water glass.

3. The inorganic fireproof and heat-insulating material according to claim 1, wherein the heat-insulating material is formed by providing expanded particle of the perlite produced by puffing at a temperature of 850° C.-1350° C., expanded particle of the vermiculite produced by puffing at a temperature of 700° C.-1250° C., the inorganic bonding agent and the curing agent to be pressurized to 18-50 MPa in the mold at a temperature of 70° C.-245° C. and keeping it for 15-60 minutes.

4. An inorganic fireproof and heat-insulating plate, comprises a plate body, wherein the plate body is made with the inorganic fireproof and heat-insulating material claimed in claim 1.

5. The inorganic fireproof and heat-insulating plate according to claim 4, wherein further comprises a decorative layer which is provided on surface of the plate body.

6. An inorganic fireproof and heat-insulating external wall structure, comprises a wall body, wherein a fireproof and heat-insulating layer, which is made with the inorganic fireproof and heat-insulating material claimed in claim 4, is provided on surface of the wall body.

7. The inorganic fireproof and heat-insulating external wall structure according to claim 6, wherein the wall body is wooden wall, concrete wall or metal wall.

8. The inorganic fireproof and heat-insulating external wall structure according to claim 6, wherein the wall body has a cylinder structure and the fireproof and heat-insulating layer is formed by more than two cambered fireproof and heat-insulating plates.

9. The inorganic fireproof and heat-insulating material according to claim 2, wherein the heat-insulating material is formed by providing expanded particle of the perlite produced by puffing at a temperature of 850° C.-1350° C., expanded particle of the vermiculite produced by puffing at a temperature of 700° C.-1250° C., the inorganic bonding agent and the curing agent to be pressurized to 18-50 MPa in the mold at a temperature of 70° C.-245° C. and keeping it for 15-60 minutes.

* * * * *